Dec. 19, 1939.   C. S. ASHCRAFT   2,183,734
METHOD AND APPARATUS FOR SUPPLYING ALTERNATING CURRENT TO ELECTRIC ARCS
Filed Oct. 21, 1938   2 Sheets-Sheet 1
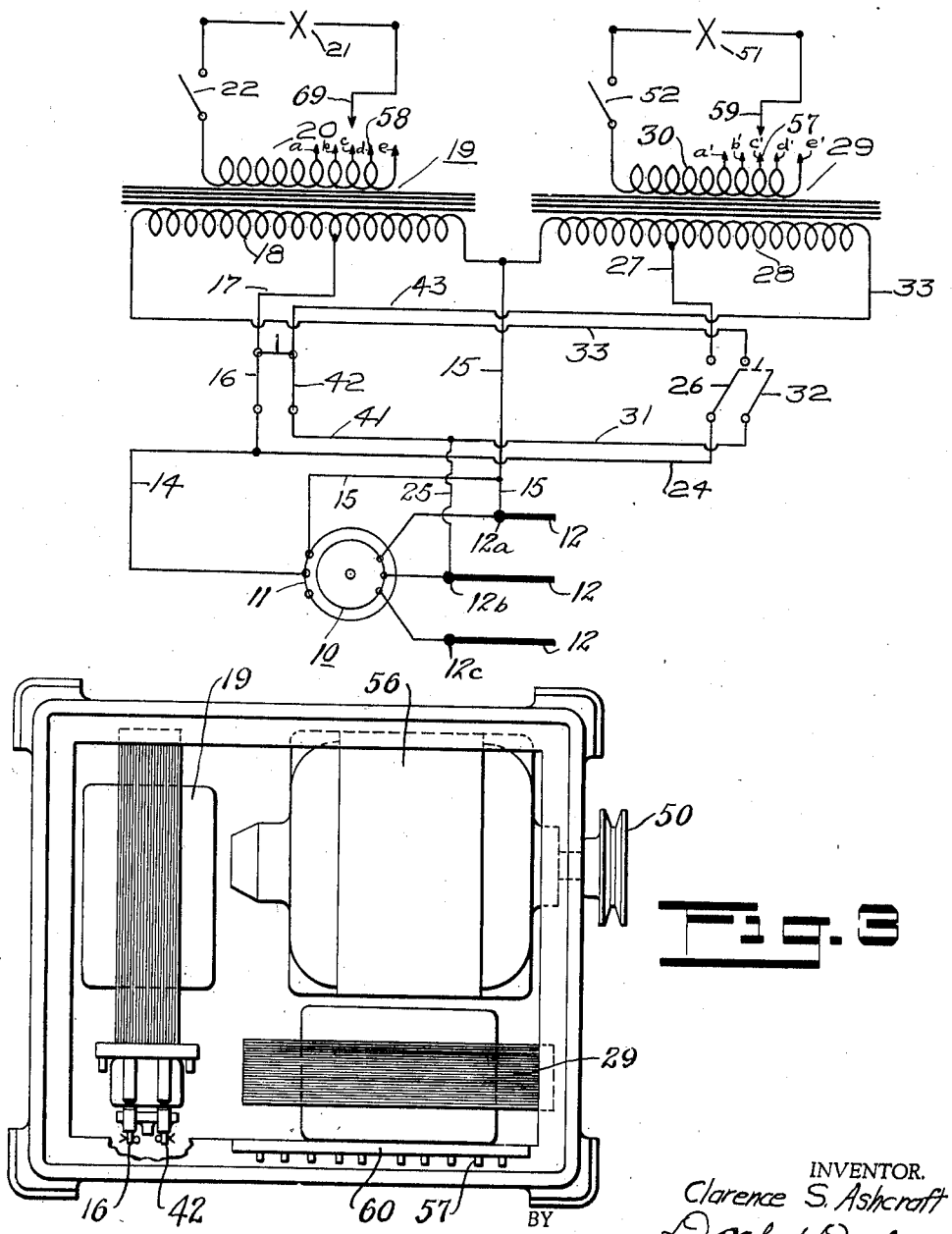
INVENTOR.
Clarence S. Ashcraft
Darby & Darby
ATTORNEYS Dec. 19, 1939.          C. S. ASHCRAFT          2,183,734
METHOD AND APPARATUS FOR SUPPLYING ALTERNATING CURRENT TO ELECTRIC ARCS
Filed Oct. 21, 1938          2 Sheets-Sheet 2
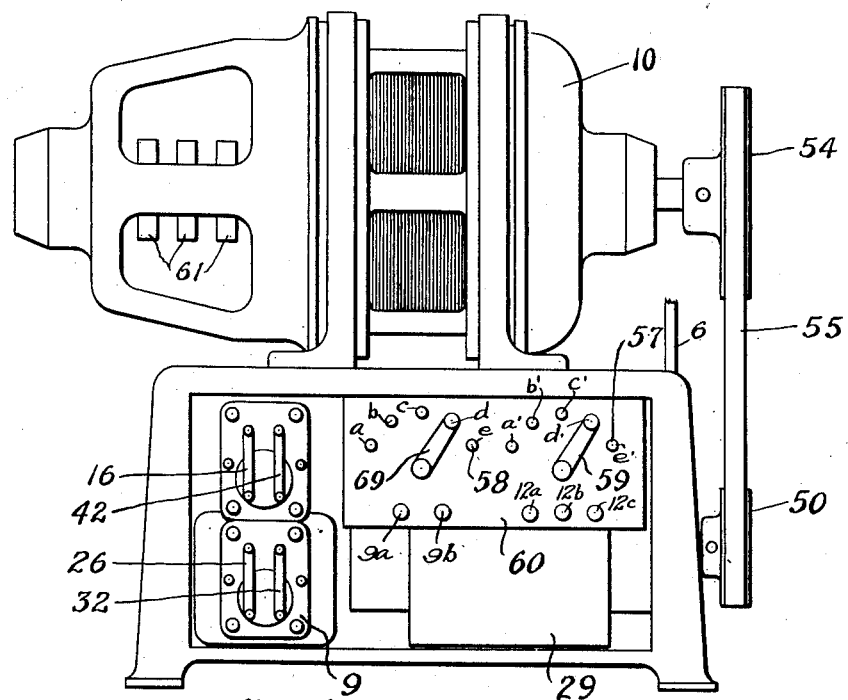
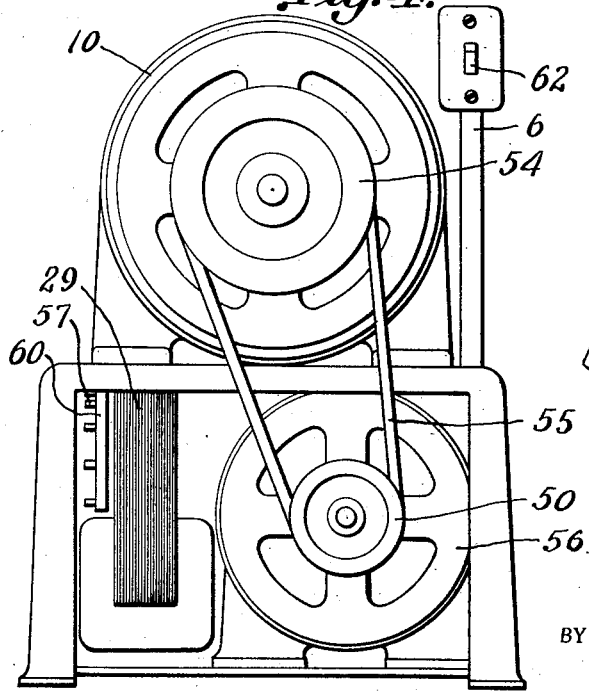
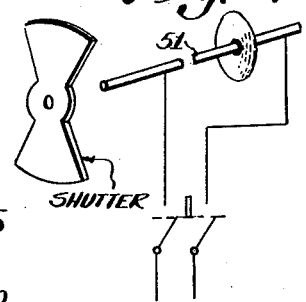
INVENTOR.
Clarence S. Ashcraft
BY Darby & Darby
ATTORNEYS Patented Dec. 19, 1939

2,183,734

UNITED STATES PATENT OFFICE 2,183,734

METHOD AND APPARATUS FOR SUPPLYING ALTERNATING CURRENT TO ELECTRIC ARCS

Clarence S. Ashcraft, Bayside, Long Island, N. Y.

Application October 21, 1938, Serial No. 236,143

14 Claims. (Cl. 176—12)

The present invention relates generally to a frequency converter and switching device, and method of operating same, for supplying alternating currents to electric arcs.

In the past, attempts have been made to use alternating current to supply energy to an arc used for motion picture projection but these have been unsuccessful for the reason that commercial alternating current frequencies do not synchronize with the light interruptions caused by the rotation of the projector shutter and, due to this lack of synchronization, there is a visible flicker by the differential between the frequency of the current and the frequency of the shutter interruptions. That is, with 60 cycle current and 48 shutter interruptions per second, there is a 12 cycle flicker.

There are, accordingly, at the present time, very few or no alternating current arc projectors in use, and this despite the fact that the alternating current arc produces a light which is substantially white, which is equal in intensity to the light from a direct current arc, and which may be operated at a much lower cost for power and carbon electrodes, and, furthermore, that when an alternating current arc is used, the lamps are simpler and less expensive, and the power source which supplies the arc is more efficient and consequently less costly, both as a matter of first cost and of maintenance, than either the rectifiers or generators commonly used for supplying power to the D. C. arc.

In my copending application Serial No. 236,142 filed October 21, 1938, I have disclosed a method of operating a projector, incorporating a source of light operating on alternating current of frequencies of around 96 cycles, whereby the projected light is steady and of uniform brilliancy.

It is an object of this invention to provide a means for supplying alternating current of higher than commercial frequency to one arc, while supplying alternating current of commercial frequency to a second arc, and to provide means whereby the current supply frequencies to said arcs may be instantaneously interchanged.

It is an object of this invention to supply alternating current to two arcs simultaneously whereby the lighting of the second arc will not alter the voltage supplied to the first arc, and whereby there will be no change in the light produced by the first arc.

It is another object of this invention to provide means for the alternate operation of two arcs on alternating current of higher than commercial frequency whereby the cost of the equipment is materially reduced due to the fact that only one frequency converter of a size capable of supplying one arc is necessary.

Other objects and advantages will become apparent from the following description.

In accordance with my present invention I have discovered a means whereby it is possible to supply alternating current of the proper frequency, for the projection of motion pictures, to two electric arcs, alternately, from a single frequency converter which is capable of supplying current, of the proper frequency, to one arc only, and at the same time, supply commercial current frequency from a power line, through a transformer, to a second arc for the purpose of heating said second arc, without drawing current from the frequency converter. For the purpose of heating the second arc, preliminary to projecting the picture, I employ simple static transformers, the secondaries of which are connected to each arc; each transformer having suitable primary windings to accommodate either commercial frequency from the power line, or a higher than commercial frequency from the converter. By means of a suitable switching device the currents of the two different frequencies supplied to the two arcs are instantaneously interchanged so that the first arc will then operate on commercial current frequency and the second arc operate on current from the converter. In this way, while the first arc is projecting the picture on current supplied from the converter, the second arc is being heated, preparatory to projecting the picture, on commercial current frequency without disturbing the current supplied to the first arc, and the currents from the two sources of power to said arcs are simultaneously interchanged when it is required that the second arc project the picture.

For the purpose of explaining my invention to those skilled in the art in order that they may practice the same, I will describe in detail a method of the preferred form of my invention. In the description which follows I will describe the details of construction of a frequency converter, the electrical connections, the operation of the switching device and current supply frequencies as well as other definite qualities and quantities which are involved in the performance of the preferred process of my invention.

In the drawings:

Figure 1 is a schematic circuit diagram illustrating a frequency converter and switching arrangement for supplying currents to a pair of electric arcs in accordance with this invention;

Figure 2 is a side elevation of the physical apparatus illustrated in Figure 1 except for the arcs 21—51 and switches 22—52, and including a motor for driving the converter;

Figure 3 is a plan view of the apparatus of Figure 2 with the frequency converter removed; and Figure 4 is a front elevation of the apparatus of Figure 2.

Figure 5 is a drawing illustrating a shutter, comprising blades providing separated light passing openings, which rotates in the path of the light beam produced by an arc and periodically interrupts said light beam.

Referring now to Figure 1, there is shown at 10 the primary, and at 11 the secondary, of a three-phase wound rotor, induction motor which is driven in the reverse direction to its operation as a motor. The primary 10 is connected across the three-phase line 12, while one phase of the secondary supplies current to the arc 21 or 51. As will be seen, if the rotor of the induction machine were stationary, the machine would act as a static transformer supplying 60 cycle current to the arc. However, when driven in reverse, the secondary frequency, for this particular 6 pole machine, with but one winding in the secondary connected, is increased one cycle for every 20 R. P. M. For a frequency of 96 cycles per second, a motor speed of 720 R. P. M. would be used. As explained in my copending application, this frequency is not critical, any frequency from 86 to 106 being permissible. It is therefore not necessary to use a synchronous motor to drive the converter, any ordinary type of motor being satisfactory.

One terminal of the secondary 11 of the rotary transformer is connected by means of conductors 14, switch blade 16 and conductor 17 to an intermediate tap of the primary 18 of a transformer 19, and the other terminal of secondary 11 is connected to the terminal of the primary 18 through the conductor 15. The secondary 20 of the transformer 19 supplies current to the arc 21 through a switch 22. The voltage on which the arc is best operated is from about 15 to about 25 volts, and for this reason the transformer 19 is a step-down transformer.

The circuit as described above when supplied with 220 volts on the primary 10 of the rotary transformer will give an output of approximately 80 volts from the secondary 11, which will be stepped down in transformer 19 to approximately 30 or 40 volts, with taps 58 and contact arm 69 to take off the voltage desired. Under such conditions the arc will operate perfectly, but I have shown in Figure 1 an additional arc and additional equipment to make it possible to operate the two arcs alternatively without increasing the size of the power supplying equipment, and particularly of the rotary transformer.

For this purpose a second transformer 29, identical with transformer 19, is connected in parallel with the transformer 19 through a switch blade 26 of the same type as switch blade 16. The circuit for this transformer is through conductors 14 and 24, switch blade 26 and conductor 27 to an intermediate tap of the primary 28 of transformer 29 and then through the left hand portion of winding 28 and over conductor 15 to the other terminal of winding 11.

Moreover, the two transformers 19 and 29 are connected, respectively, through conductors 25, 31, switch blade 32, conductor 33 and conductor 15, and through conductors 25, 41, switch blade 42, conductor 43 and conductor 15, across one phase of the three-phase supply line 12. Switch blades 16 and 42, and 26 and 32, operate simultaneously, one closing as the other opens. The secondary 30 of transformer 29 connects through switch 52 to the second arc 51, with taps 57 and contact arm 59 to get the voltage desired. With this arrangement either arc may be put in operation on 96 cycle current from the converter and, when it is so placed in operation, the other arc may at any time be supplied with alternating current at the desired voltage, say 20 volts, by closing the switch in the secondary circuit of its transformer, that is, switch 22 or 52. Switch blades 16, 42 and 26, 32 will never be closed at the same time since this would put both arcs in operation on both the 96 cycle frequency changer current and 60 cycle power line current at the same time. Proper interlocking relays are provided to prevent this.

If we assume that the arc 21 is in operation, then switch blades 16 and 42 will be closed, while switch blades 26 and 32 will be in the open position. Thus 80 volt current at 96 cycles frequency will be supplied to the primary of transformer 19 through the circuit comprising the secondary winding 11 of the rotary transformer, conductor 14, switch blade 16, conductor 17, transformer tap and the right hand portion of the transformer winding, and conductor 15 to the opposite terminal of the secondary 11 of the rotary transformer. If at this time the switch 22 is closed, secondary current will be available to the arc gap for the projection of light. At the same time 220 volt current will be applied to the primary of transformer 29 through the circuit comprising conductor 25, conductor 41, switch blade 42, conductor 43, the entire primary winding 28 of the transformer 29, and conductor 15 to the second phase of the line 12. Due to the fact that the switch 52 would normally be open, there will be no current flow through the arc circuit, but if at any time it is desirable to switch from one arc to the other it is only necessary to close the switch 52, whereupon the second arc will be ready to operate on the 220 volt, 60 cycle line. This operation is not, as has been explained above, satisfactory for actual projection, but it does serve to heat the arc and condition it for operation on 96 cycle current. After the arc has been thus heated for a sufficient length of time, switch blades 16 and 42 are opened and switch blades 26 and 32 immediately closed, which, as will be obvious from the drawing, immediately supplies 96 cycle current to the second arc and 60 cycle current to the first arc. By opening the switch 22 the first arc may then be removed from service.

The great advantage of the apparatus just described is that it permits a single frequency conversion unit to be used with two projectors, with no delay between the time the 96 cycle current is supplied to the arc and the time the arc is operating effectively at this frequency. As the frequency conversion unit is an expensive piece of apparatus relative to the cost of ordinary static transformers, this greatly reduces the cost of equipment necessary to provide for moving picture projection in accordance with my new method of operating the light source. As there is some loss of power in such a unit, this loss is avoided for the time each arc is operated from the power line.

The parts in Figures 2 to 4 will be understood from the reference numerals of Fig. 1.

There is also shown in these figures a motor 56 with a pulley 50 and belt 55 for driving the rotor primary 10 of the frequency conversion unit through pulley 54. Using a belt for this drive permits any desired ratio so that the desired frequency for the operation of the arc may be obtained expeditiously by simply changing pulleys. I have also illustrated slip rings 61 (Fig. 2) for taking the single phase secondary current from the frequency converter, and a relay 9 operated by a switch 62 mounted on upright 6 for operation of the switch having switch blades.

It will, of course, be understood that the unit just described is for convenience and economy of operation with two light sources where 60 cycle current is available in the power line, but does not affect the results obtained from the operation of my light source. I may use any type of conversion unit such as one employing electronic tubes, for example, and I may use current of the proper frequency from any source from which it may be obtained, whether generated by the use of electronic tubes, an alternator, or in any other manner.

While a preferred embodiment of my invention has been described, it is to be understood that this description is not a limitation upon the scope of the invention, which is to be determined only by the appended claims.

What is claimed is:

1. In combination, an electric power line, a frequency changer, a first transformer, a second transformer, a light source connected to the output of each transformer, an electrical circuit, and interconnected switches, whereby current may be supplied direct from said power line to either of said transformers, and simultaneously current may be supplied from said frequency changer to the other of said transformers.

2. In combination, a power line, a converter electrically connected thereto for converting the frequency of the current from said line to a different frequency, a first transformer, a second transformer, a light source connected to the output of each transformer, and means for alternatively supplying current from said power line to either of said light sources through one of said transformers, and for simultaneously supplying current from said converter to the other of said light sources through the other of said transformers.

3. A power line, a frequency converter electrically connected thereto for converting the current from said power line to a frequency of approximately 96 cycles, a first transformer, a second transformer, means for supplying current to either of said transformers from said converter, an electric arc connected to the output of each transformer, and means for supplying current from the power line to either of said arcs through one of said transformers while supplying current from the converter to the other of said arcs through the other of said transformers.

4. A frequency conversion unit comprising a rotary converter, a motor for driving said converter, a pair of transformers, a light source connected to the output of each transformer, a switch, and connections whereby when said unit is connected to a power line current is supplied directly from said power line to either of said transformers and current is supplied to the other of said transformers from said rotary converter, and by operation of said switch the connections may be reversed so that current is supplied to said other transformer directly from the power line and to the first transformer from the rotary converter.

5. A frequency conversion unit comprising means for converting current of one frequency into current of a different frequency, a first transformer, a second transformer, a light source connected to the output of each transformer, a switch, connections whereby when said switch is in one position and the unit is connected to a power line current will be supplied direct from the power line to the first transformer and current will be supplied to the other transformer from the converter, and when the switch is in another position current will be supplied to said second transformer from said power line and current will be supplied to said first transformer from said converter.

6. A frequency conversion unit comprising a frequency converter, a pair of transformers, a light source connected to the output of each transformer, a switch, means for supplying current direct from the power line to either of said transformers and from the converter to the other of said transformers, and taps on said transformers whereby the desired voltage may be taken off.

7. The method of operating a pair of electric arcs from a single source of power which comprises supplying current of an operating frequency derived from said source to one of said arcs and simultaneously supplying current of a different frequency from said source to the other of said arcs.

8. The method of operating a pair of electric arcs from a single source of power which consists in operating one arc from approximately 96 cycle current derived from said source, while heating the other arc preliminary to its operation with current of a frequency other than 96 cycles from said source.

9. The method of operating a pair of electric arcs from a single source of power which consists in operating one arc with a current of approximately 96 cycles derived from said source while heating the other arc preliminary to its operation with a current of approximately 60 cycles from said source.

10. In combination, a power line, a frequency converter electrically connected to said power line, a pair of electric arcs, means for periodically interrupting the light from said arcs at the same rate, and means whereby current is supplied to one of said arcs from said converter at a frequency which is an integral multiple of the rate of light interruption, and to the other of said arcs at a frequency which is not an integral multiple of the rate of light interruption.

11. In combination, a frequency converter, a pair of electric arcs, means for periodically interrupting the light from said arcs about 48 times per second, and means for supplying current of approximately 96 cycles from said converter to either of said arcs while supplying current of a different frequency to the other of said arcs.

12. The method of operating a pair of electric arcs which consists in operating one of said arcs from a single source of current with current at approximately 96 cycles derived from said source while heating the other arc preliminary to its operation with current at 60 cycles from said source, and substantially simultaneously shifting the current of said first arc to said second arc and the current of said second arc to said first arc.

13. In a device of the class described, a plurality of arc light sources, a source of current of standard voltage and frequency, a converter for converting said current to a higher frequency and lower voltage, means to supply one of said arcs with said higher frequency, low voltage, current from said converter, and means to simultaneously supply another of said arcs with current of said standard frequency and voltage from said current source whereby said last-mentioned arc may be prepared for subsequent operation by current from said converter during operation of said first arc from said converted current.

14. In an arc lighting system, a frequency conversion unit, comprising a frequency converter electrically connected to a power line, a pair of transformers, a light source connected to the output of each transformer, and means whereby the input current may be supplied directly to either of said transformers from said power line, and to the other of said transformers from said conversion unit.

CLARENCE S. ASHCRAFT.